United States Patent [19]

Fukushima

[11] 4,420,062
[45] Dec. 13, 1983

[54] AUTOMOTIVE VEHICLE NOISE REDUCTION DEVICE

[75] Inventor: Masao Fukushima, Fuchu, Japan

[73] Assignee: Nissan Motor Co., Ltd., Yokohama, Japan

[21] Appl. No.: 391,931

[22] Filed: Jun. 24, 1982

[30] Foreign Application Priority Data

Jun. 26, 1981 [JP] Japan .................. 56-95559[U]

[51] Int. Cl.³ .................................... F01N 1/24
[52] U.S. Cl. .................................... 181/204; 181/264; 123/198 E
[58] Field of Search ............... 181/204, 205, 264, 293; 180/69.2, 89.2; 123/198 R, 198 E

[56] References Cited

U.S. PATENT DOCUMENTS 3,949,726  4/1976  List .................. 181/204 X

FOREIGN PATENT DOCUMENTS 27315   4/1981  European Pat. Off. ........... 181/204
2914209 10/1979  Fed. Rep. of Germany ...... 181/204

Primary Examiner—Benjamin R. Fuller
Attorney, Agent, or Firm—Schwartz, Jeffery, Schwaab, Mack, Blumenthal & Koch

[57] ABSTRACT

An automotive vehicle noise reduction device comprises an under-cover structure fixedly disposed directly under an engine and including a plate member securely connected to a vehicle body, a plurality of covering members which are spaced from each other and fixedly disposed between the plate member and the engine, and a sound absorbing material securely attached on each covering member and located opposite to the plate member, thereby effectively improving noise insulation effect while preventing vehicle fire.

6 Claims, 11 Drawing Figures 4,420,062

AUTOMOTIVE VEHICLE NOISE REDUCTION DEVICE

BACKGROUND OF THE INVENTION

1. Field of the Invention

This invention relates to an improvement in a noise reduction device for an automotive vehicle, and more particularly to an engine under-cover for making engine noise harmless.

2. Description of the Prior Art

In connection with noise reduction of automotive vehicles an under-cover is installed right under an engine so as to prevent engine noise from emitting outside of the vehicle. Such a conventional undercover is usually formed of a flat plate member and securely connected to side-members of a vehicle body. However, this flat under-cover is not so high in noise insulation effect, thereby allowing engine noise from leaking outside of the under-cover.

SUMMARY OF THE INVENTION

In accordance with the present invention, a noise reduction device for an automotive vehicle, comprises an under-cover fixedly disposed directly under the engine. The under-cover includes a plate member securely connected to a vehicle body. A plurality of covering members are fixedly disposed between the plate member and the engine, and spaced from each other to define a space between the adjacent covering members. Additionally, a sound absorbing material is securely attached on each covering member and located opposite to the plate member. Therefore, noise from the engine can be effectively absorbed by the sound absorbing materials thereby improving the noise insulation effect of the under-cover. Furthermore, engine oil dropped from the engine does not adhere onto the sound absorbing materials, thus preventing vehicle fire.

BRIEF DESCRIPTION OF THE DRAWINGS

The features and advantages of the noise reduction device of the present invention will be more clearly appreciated from the following description taken in conjunction with the accompanying drawings in which like reference numerals designate like parts and elements, in which.

DETAILED DESCRIPTION OF THE INVENTION

Figure 1:
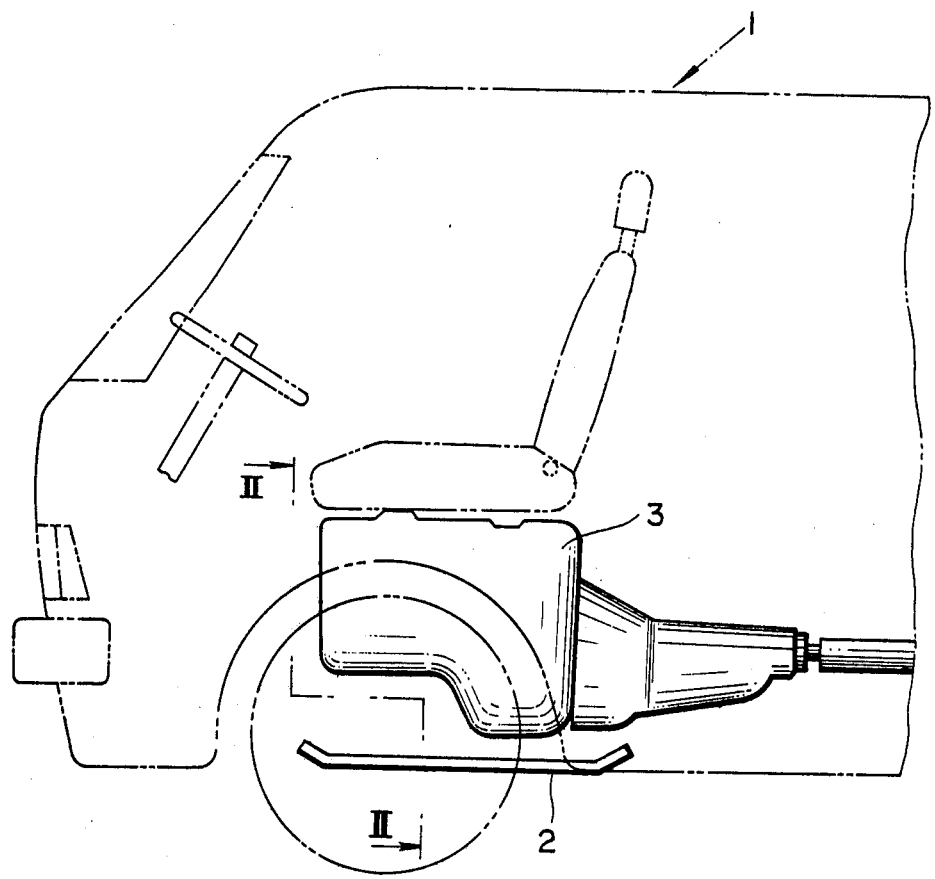
FIG. 1 is a schematic side view of an automotive vehicle provided with a conventional noise reduction device or under-cover.
Figure 2:
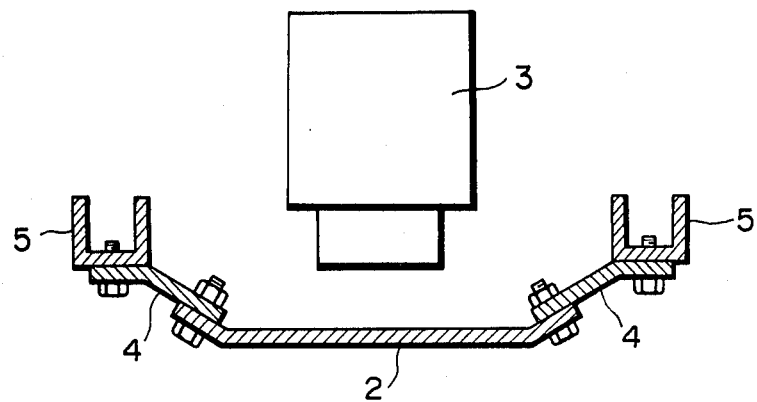
FIG. 2 is a sectional view taken in the direction of arrows substantially along the line II—II of FIG. 1.
Figure 3:
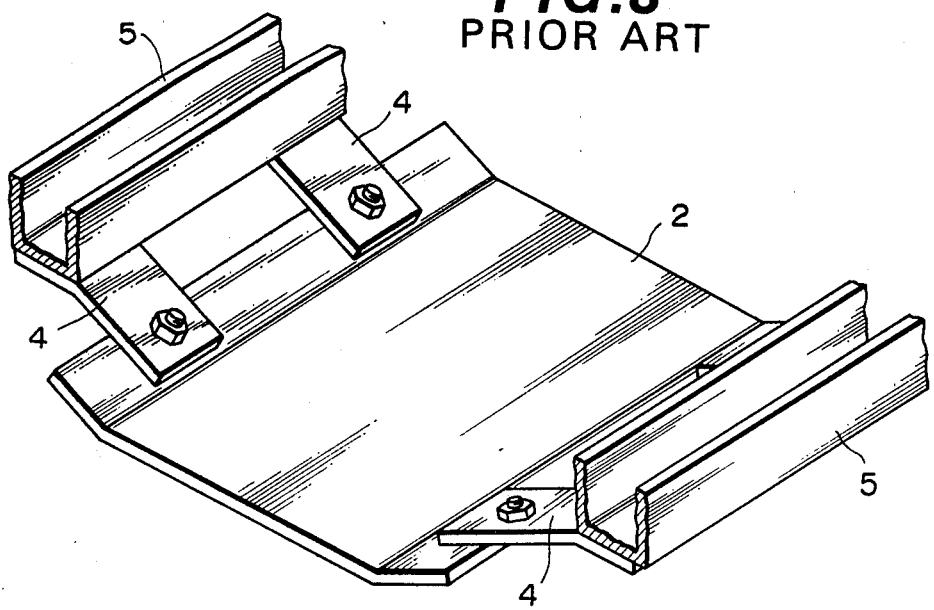
FIG. 3 is a perspective view of the conventional under-cover of FIG. 1.

To facilitate the understanding of the present invention, a brief reference will be made to an example of conventional under-covers for noise reduction, depicted in FIGS. 1 and 3. Referring to FIGS. 1 to 3, an automotive vehicle 1 is provided with an under-cover 2 which is generally flat and of the shape of a plate. The under-cover 2 is located generally horizontally and right under an engine 2 mounted on a vehicle body. The under-cover 2 is fastened to side-members 5 through brackets 4 attached at opposite side ends of the under-cover 2, which side-members 5 constitute part of the vehicle body. Thus, the under-cover functions to prevent engine noise from emitting to the outside of the vehicle.

Figure 4:
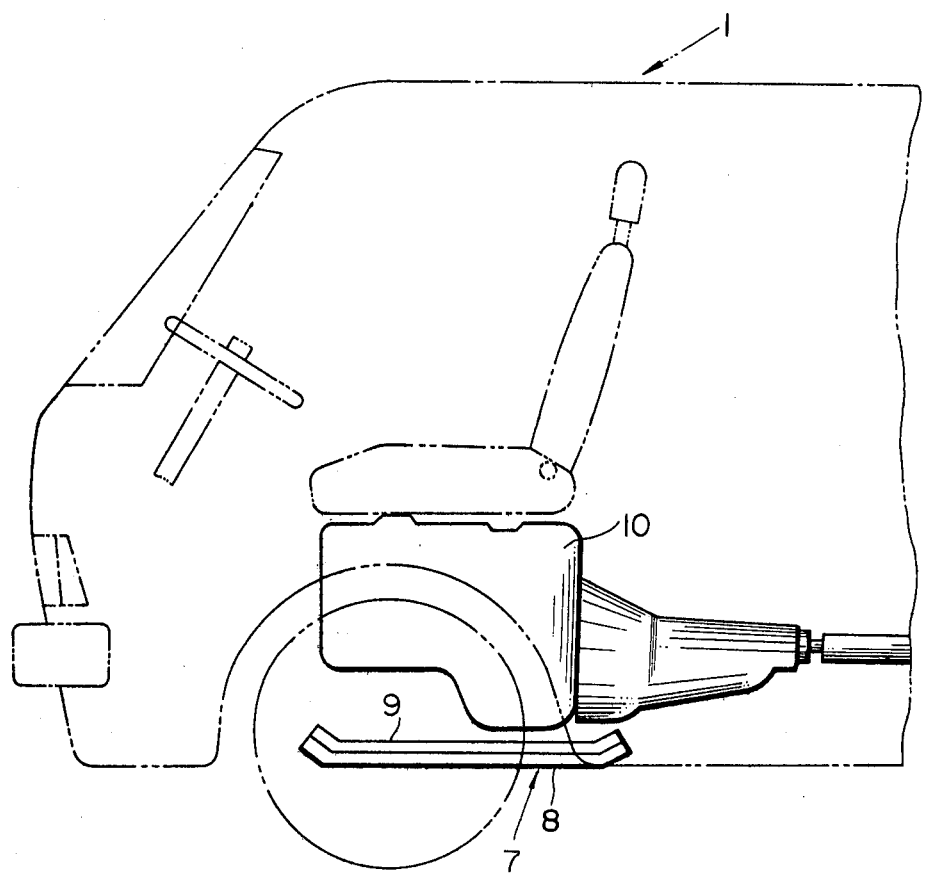
FIG. 4 is a schematic side view of an automotive vehicle provided with another conventional under-cover.

However, since such an under-cover 2 is formed merely of a piece of plate, its noise insulation effect is lower, thereby allowing engine noise to leak outside of the vehicle 1. Apart from the above, FIG. 4 shows another example of a conventional under-cover. In this example, an under-cover 7 is constituted of a piece of flat plate 8, and a sound-absorbing material 9 which is securely attached on the upper surface of the flat plate 8 which upper surface is opposite to an engine 10. Even with the thus arranged under-cover 7 provided with the sound-absorbing material 9, oil dropped from the engine 10 remains adhered onto the sound-absorbing material 9 and therefore there is a possibility of causing vehicle fire.

Figure 5:
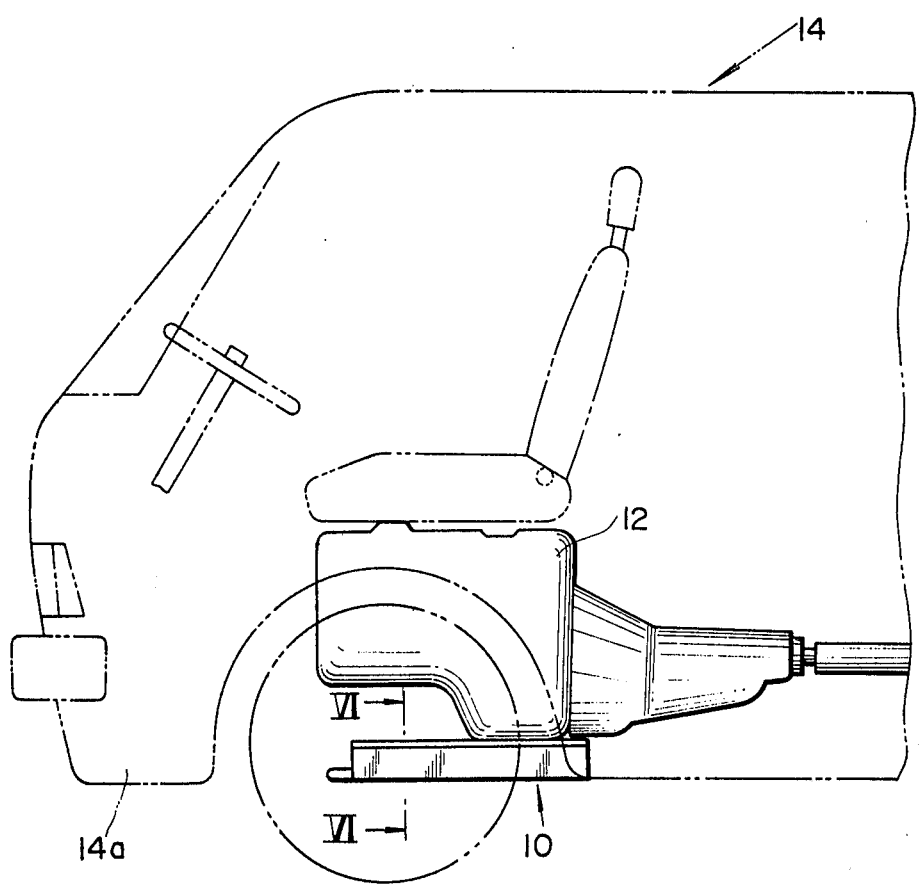
FIG. 5 is a schematic side view of an automotive vehicle provided with a preferred embodiment of an engine noise reduction device or under-cover in accordance with the present invention.
Figure 6:
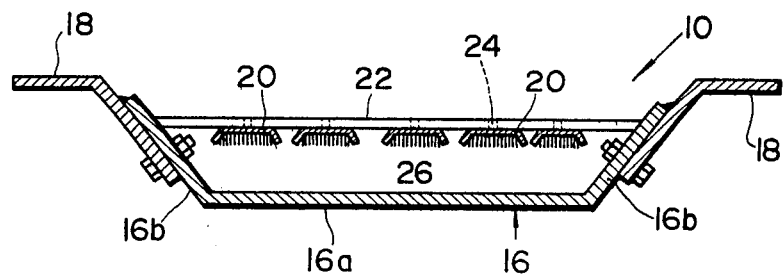
FIG. 6 is a sectional view taken in the direction of arrows substantially along the line VI—VI of FIG. 5.
Figure 7:
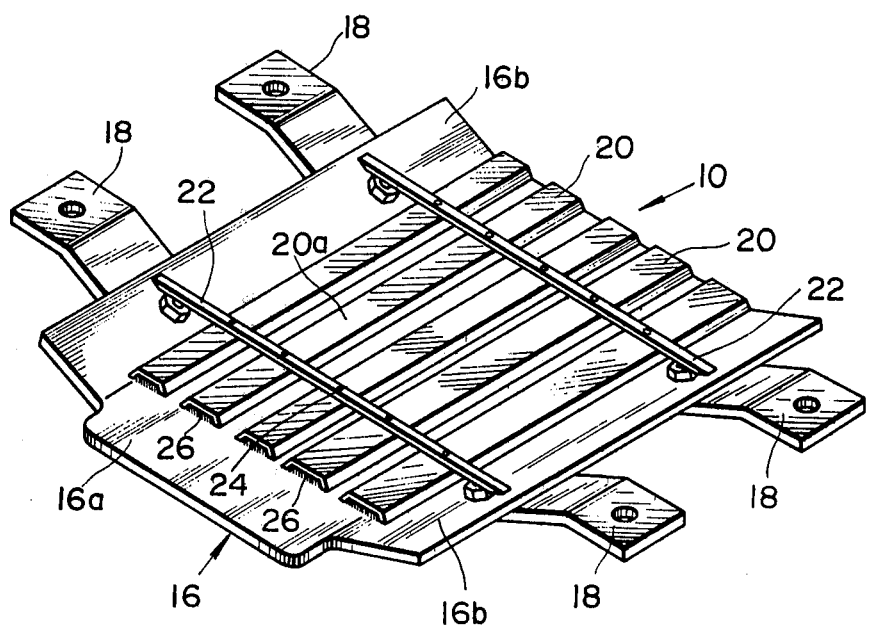
FIG. 7 is a perspective view of the under-cover of FIG. 5.

In view of the above description of the conventional under-cover, reference is now made to FIGS. 5 to 11, and more particularly to FIGS. 5 to 7, wherein a preferred embodiment of a noise reduction device or under-cover structure of the present invention is illustrated by the reference numeral 10. The under-cover structure 10 is located directly under an internal combustion engine 12 of an automotive vehicle 14. The engine 12 is securely mounted, as usual, on a vehicle body 14a of the vehicle 14. The under-cover structure 10 is located generally horizontally, i.e., parallel with the ground on which the vehicle runs. The under-cover structure 10 includes a main body plate member 16 made of a piece of plate which plate member has a horizontal middle section 16a which is disposed generally parallel with the ground. Two inclined side sections 16b are integral with the middle section 16a at the opposite side ends, and so located that the upper surfaces thereof face to each other. The two side sections 16b extends along the length of the vehicle body 14a, and securely connected through brackets 18 to side-members (not shown) forming part of the vehicle body 14a.

A plurality of elongated covering members 20 are disposed between the main body plate member 16 and the engine 12, i.e., located spaced a predetermined distance from the main body plate member middle section 16a in the upward direction or the direction toward the engine 12. These covering members 20 are spaced a predetermined distance from each other in the direction of the width of the vehicle body 14a, and extend parallel along the length of the vehicle body 14a. In this instance, each covering member 20 is formed generally in the shape of the counterpart (]) of square brackets in cross-section and accordingly has a top flat surface 20a on which engine oil may drop from the engine 12. It is preferable that the ratio between the total surface areas of whole covering member top flat surfaces 20a and the surface area of the main body plate member 16 is 1:2. The covering members 20 are secured to elongated holder members 22 each of which extends in the direction of the width of the vehicle body 14a, and is fixedly connected at its opposite ends to the inclined side plate sections 16b. Accordingly, the holder member 22 is so located that its axis intersects at right angles the axis of each covering member 20 as viewed from the direction of the engine 12. Each covering member 20 is connected to each holder member 22 by means of a small screw 24 in such a manner that the top flat surface 20a of each covering member 20 contacts the holder member 22.

Additionally, a sound absorbing material 26 is fixedly attached on the lower surface, facing to the main body plate member 16, of each covering member 20 by means of adhesion. The sound absorbing material is a known material having sound absorption effect and is made, for example, of glass wool, rock wool, soft polyurethane foam, asbestos, flocked fabric, or wood tip containing cement. It will be appreciated that the plate member 16, the covering members 20, the holder members 22, and the sound absorbing material 26 constitute as a whole the under-cover structure 10.

The operation of the thus arranged under-cover 10 will be discussed hereinafter.

Figure 8:
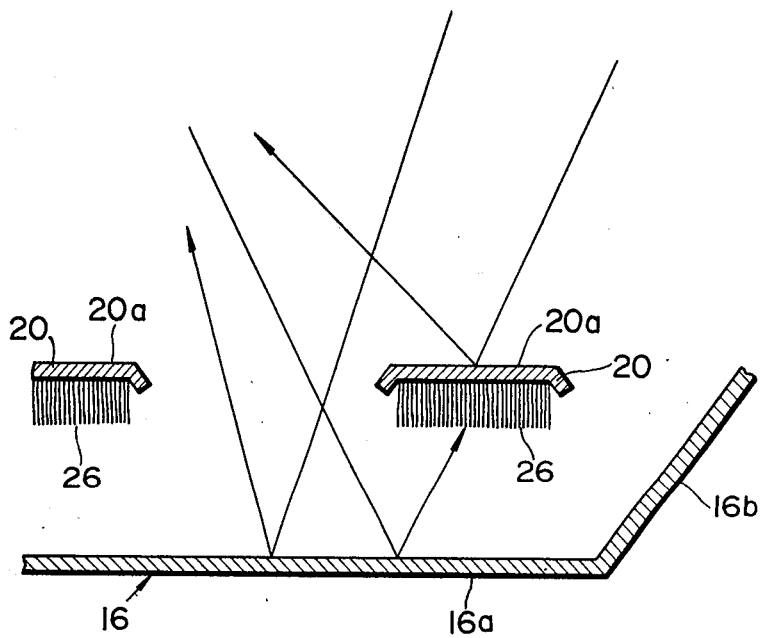
FIG. 8 is a sectional illustration showing the operation of the under-cover of FIG. 5.

During vehicle cruising, the vehicle 14 provided with the under-cover structure 10 emits a higher level engine noise particularly at its acceleration. As illustrated in FIG. 8, a part of such engine noise reflects on the top flat surface 20a of each covering member 20, and the other part passes through a space between the adjacent covering members 20 and then reflects on the upper surface of the main body plate member middle section 16a to be absorbed in the sound absorbing materials 26. Thus, the noise from the engine 12 is obliquely directed on the main body plate member middle section 16a and the noise passing between the covering members 20 is absorbed by the sound absorbing materials 26, thereby effectively insulating the engine noise from emitting outside of the vehicle 14. Furthermore, if engine oil drops from the engine 12, it adheres on the top flat surface 20a of each covering member 20 and accordingly never adheres on the sound absorbing material 26 which is attached on the opposite lower surface of the covering member 20, thereby omitting the possibility of causing vehicle fire.

Figure 9:
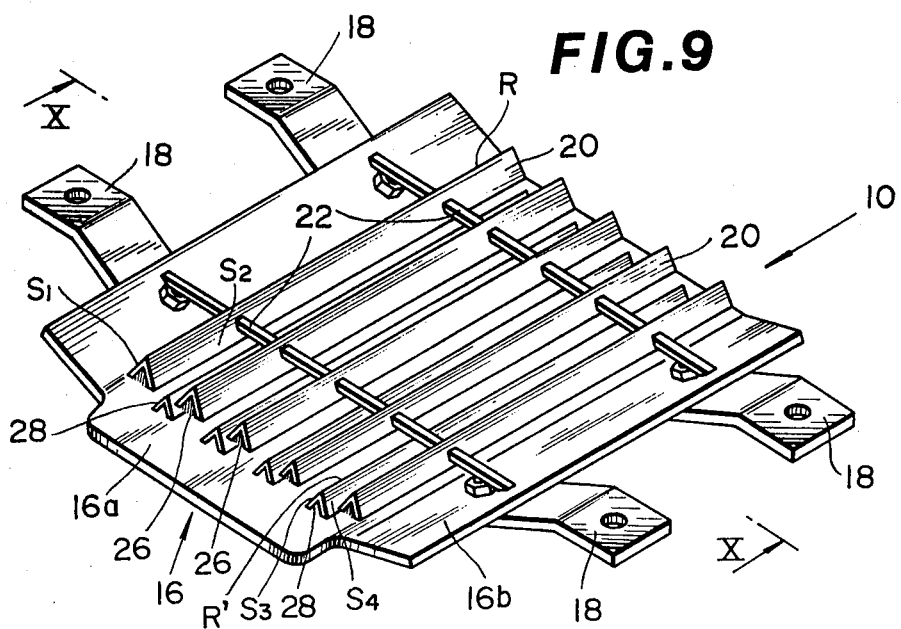
FIG. 9 is a perspective view of another embodiment of the under-cover in accordance with the present invention.
Figure 10:
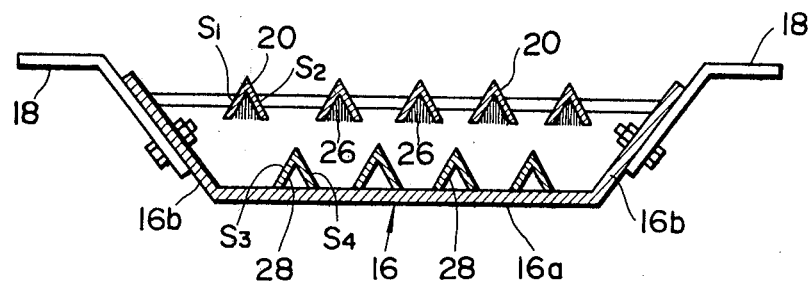
FIG. 10 is a sectional view taken in the direction of arrows substantially along the line X—X of FIG. 9.
Figure 11:
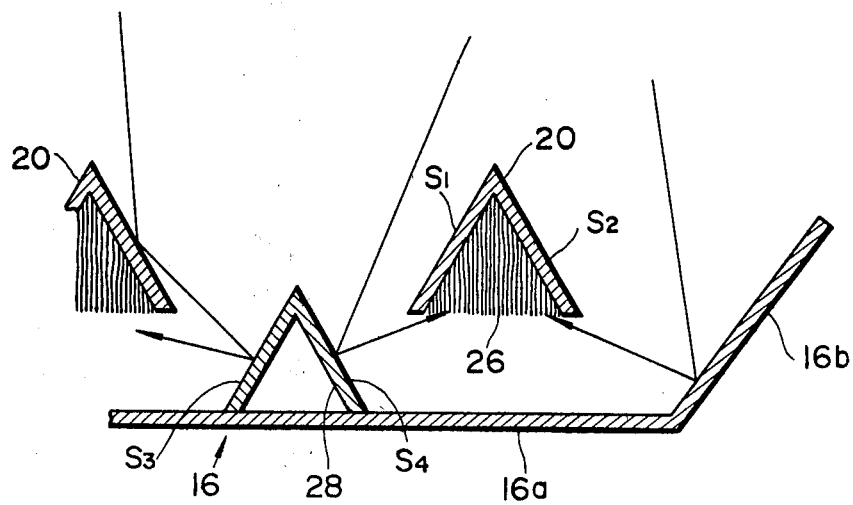
FIG. 11 is a sectional illustration showing the operation of the under-cover of FIG. 9.

FIGS. 9 and 10 illustrate another embodiment of the under-cover structure of the present invention, wherein each covering member 20 is generally V-shaped in cross-section and accordingly formed with two inclined surfaces $S_1$, $S_2$ which are integral with each other at an elongated ridge R extending along the axis of the covering member 20. Each covering member 20 is so located that the ridge R faces to the engine 12. Therefore, the sound reflection effect of the covering member surface is weakened, thereby contributing to an improvement in noise insulation by the under-cover structure 10. As shown, the covering members 20 are connected in parallel with each other by two elongated holder members 20. Additionally, a plurality of noise reflection members 28 are securely disposed on the upper surface of the main body plate member middle section 16a. Each noise reflection member 28 is generally V-shaped similarly to the covering member 20 and consequently has two inclined surfaces $S_3$, $S_4$ which join with each other at an elongated ridge R' extending along the axis of the noise reflection member 28. Each noise reflection member 28 extends parallel with the covering member 20 and so located that the ridge R' generally faces to the engine 12. As a result, as illustrated in FIG. 11, the engine noise passing between the covering members 20 is diffused by virtue of diffused reflection thereof on the inclined surfaces $S_3$, $S_4$ of each noise reflection member 28. Hence, if the sound absorbing material is used in the same amount as in the embodiment of FIGS. 5 to 7, sound insulation effect of this embodiment can be improved as compared with the latter embodiment.

As appreciated from the above, according to the present invention, the under-cover structure is constructed of the main body plate member, the covering members located between the main body plate member and the engine, and the sound absorbing material attached on the lower surface of each covering member. Therefore, the under-cover is greatly improved in noise insulation effect, thereby reducing engine noise. Besides, if engine oil drops from the engine, it never adheres onto the sound absorbing material, thus omitting the possibility of causing vehicle fire.

What is claimed is:

1. A noise reduction device for an automotive vehicle having an engine and a vehicle body, said noise reduction device comprising:
   an under-cover structure fixedly disposed under said engine and including,
   a plate member securely connected to said vehicle body,
   a plurality of covering members which are spaced from each other and fixedly disposed between said plate member and said engine, and
   a sound absorbing material securely attached to each covering member and located opposite to said plate member.

2. A noise reduction device as claimed in claim 1, wherein each covering member extends in the direction of the length of said vehicle body, in which said covering members are located parallel with each other to define a straight elongated space between the adjacent covering members.

3. A noise reduction device as claimed in claim 2, each covering member is secured to an elongated holder member whose opposite ends are securely connected to said plate member.

4. A noise reduction device as claimed in claim 2, wherein each covering member is formed with first and second opposite flat surfaces which face said engine and said plate member, respectively, said sound absorbing material being attached on said second flat surface.

5. A noise reduction device as claimed in claim 2, wherein each covering member is V-shaped in cross-section and formed with first and second inclined surfaces which join with each other at a ridge which generally faces to said engine.

6. A noise reduction device as claimed in claim 5, further comprising a plurality of noise reflection members securely disposed on the surface of said plate member and extend parallel with said covering members, each noise reflection member being V-shaped in cross-section and having first and second inclined surfaces which join with each other at a ridge which generally faces to said engine.

* * * * *